United States Patent Office 3,236,874
Patented Feb. 22, 1966

---

3,236,874
CHLOROCYCLOHEXANE CARBONITRILES
Robert Robinson, Great Missenden, Bucks, and Gordon Ian Fray, Sandhurst, Camberley, Surrey, England, assignors to Shell Oil Company, New York, N.Y., a corporation of Delaware
No Drawing. Filed Jan. 16, 1963, Ser. No. 251,731
Claims priority, application Great Britain, Jan. 18, 1962, 1,895/62
4 Claims. (Cl. 260—464)

2,6-dichlorobenzonitrile has recently been found to have outstanding herbicidal properties with particular toxicity to germinating seeds. This invention relates to novel intermediates for preparing this and related compounds from readily available starting materials.

According to the present invention, a process for preparing 2,6-dichlorobenzonitrile comprises subjecting a cyclohexane derivative to an elevated temperature sufficient to effect conversion to said nitrile, said cyclohexane derivative having the general formula:

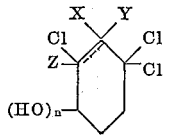

wherein
$n=0$ and
X represents a halogen atom, particularly a chlorine atom, or the group OR, wherein R represents the radical of a monobasic organic acid, or of a polybasic organic or inorganic acid whose remaining acidic function or functions is or are present as such or in salt or ester form and Y represents the CN group; or
X represents a hydroxyl group and Y represents the group $CONH_2$;
Z represents a chlorine atom; or
$n=1$ and
Y represents the group $CONH_2$, X and Z together forming a second bond between their respective ring carbon atoms (indicated by a dotted line), and Z represents a chlorine atom.

X may represent the group OR wherein R represents the radical of a monobasic organic acid or of a polybasic organic or inorganic acid, the remaining acidic functions thereof being present as such or in salt or ester form. The organic acid may be saturated or unsaturated and may be aliphatic, alicyclic, aromatic or of mixed type, for example, an aliphatic substituted aromatic acid or an aromatic substituted aliphatic acid. The acid may be unsubstituted or substituted, for example, by halogen, preferably chlorine. The acid may be a carboxylic acid or a sulphonic acid. Since the group OR is eliminated in the thermal conversion process, R advantageously represents a relatively small group of not more than 7 carbon atoms. Preferably R represents the radical of an aliphatic carboxylic acid or sulphonic acid of 1 to 4 carbon atoms or of a chlorinated derivative thereof, for example, acetic acid or a homologous acid, monochloroacetic acid, trichloroacetic acid or methane sulphonic acid, particularly acetic acid, or the radical of an aromatic acid such as benzoic acid or p-toluenesulphonic acid. Examples of suitable polybasic acids are oxalic acid, succinic acid, phthalic acid or one of its isomers, sulphuric acid or phosphoric acid. Remaining acid functions present in salt form are preferably alkali or alkaline earth metal salts. Remaining acidic functions present in ester form may be esters of aliphatic alcohols, preferably of aliphatic alcohols containing 1 to 4 carbon atoms in the molecule, particularly of methanol or ethanol, but are preferably esters of the cyanohydrin of 2,2,6,6-tetrachlorocyclohexanone. These preferred compounds are thus normal esters of polybasic organic or inorganic acids with said cyanohydrin, for example the diester of sulphuric acid of formula:

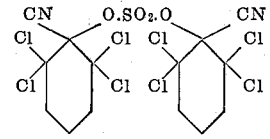

or of oxalic acid of formula

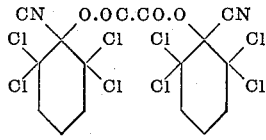

The temperature at which the conversion of the aforesaid cyclohexane derivative to the nitrile is effected will depend to some extent on the nature of the atom or group which X represents and should preferably be sufficient only to induce the desired chemical rearrangement. In general, a temperature of at least 200° C. is required. A temperature in the range 200° to 300° C. is particularly suitable, a temperature in the range 210° to 270° C. being preferred.

When Y represents the group $CONH_2$, it is advantageous to carry out the pyrolysis in presence of a dehydrating agent, i.e., a compound or catalyst which facilitates the removal of the elements of water from the amide group, for example, phosphorus pentoxide, oxychloride, trichloride, pentachloride or mixtures of phosphorus oxychloride and phosphorus trichloride or pentachloride. Phosphorus pentoxide is the preferred dehydrating agent.

The conversion may be effected by heating the cyclohexane derivative in absence of a liquid reaction medium, or a liquid reaction medium which may be solvent for the cyclohexane derivative and/or for the 2,6-dichlorobenzonitrile, and which is of suitable high boiling point and is stable at the conversion temperature employed, may be used. An effective way of carrying out the conversion in some cases comprises contacting the cyclohexane derivative with molten paraffin wax maintained at or slightly above the appropriate conversion temperature. The 2,6-dichlorobenzonitrile formed distils or sublimes from the molten mass and is collected in a cooled receiver; this process may be carried out under reduced pressure. The conversion may be effected in fluid or solid phase. It is preferably carried out under atmospheric pressure but lower or higher pressures may be used if desired. The process may be carried out batchwise, for example, by heating in a glass or other corrosion resistant vessel fitted with reflux condenser and a vent for the evolved gases. Advantageously, a continuous procedure is employed in which the starting material is passed through a heated tube, for example, of glass, quartz, porcelain or corrosion resistant metal. The tube may be empty or it may be packed with either an inert packing material or with a catalytically active material. The conversion may also be effected by contacting the vaporised starting material with a glowing filament, for example, of platinum The above cyclohexane derivatives used as starting materials in the process of the invention are novel compounds. According to an extension of this process, compounds of the above general formula, wherein $n=0$, Z represents a chlorine atom and X represents a chlorine or bromine atom are prepared by treating the corresponding cyanohydrin with a suitable chlorinating or brominating agent for example, thionyl chloride or thionyl bromide. A particularly suitable method comprises treating the cyanohydrin with thionyl chloride or thionyl bromide, preferably with an excess thereof, in presence of a tertiary nitrogenous base, for example, pyridine, and preferably in presence of a minor proportion thereof. This process may be effected in absence of a solvent or an inert solvent, for example, a chlorinated hydrocarbon, such as carbon tetrachloride, may be employed. Suitably, the reactants or reactants and inert solvent, are heated together under reflux for a short period of hours, after which the volatile material is removed. On treating the residue with methanol, 1,2,2,6,6-pentachlorocyclohexane-carbonitrile or its 1-bromo analogue is obtained in crystalline form. If desired, it can be purified by recrystallisation from a solvent. A mixture of chloroform and ether has been found to be a suitable solvent for this purpose.

Cyclohexane derivatives of the above general formula in which X represents the group OR and R represents the radical of an organic or inorganic acid as hereinbefore specified, may be prepared by treating the corresponding cyanohydrin with an esterifying agent according to methods well known in the art. Preferably the cyanohydrin is treated with the anhydride of the acid ROH, or with the acid halide, suitably the acid chloride, optionally in presence of a minor proportion of a tertiary nitrogenous base, for example, pyridine. The ester of cyanohydrin isolated from the reaction mixture is, in general, a solid and can, if desired, be purified by recrystallisation from a solvent. Chlorinated hydrocarbon solvents, for example, chloroform, are suitable for this purpose. The cyanohydrin may also be treated with the acid ROH, advantageously with simultaneous removal of the water formed in the reaction and, where organic acids are used, preferably in presence of an esterification catalyst, for example, hydrogen chloride or concentrated sulphuric acid. Alternatively the cyanohydrin may be esterified by an interchange reaction with an ester of the acid ROH with a readily volatile alcohol, for example, methyl alcohol or ethyl alcohol.

Where the acid ROH contains one or more additional acidic groups, these further acidic groups may be present as such or in the form of salts or esters. Advantageously, each acid group of the acid ROH is esterified by a molecule of the above cyanohydrin.

According to another extension of the process of the invention, the amide of the formula

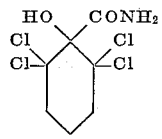

used as starting material for conversion to 2,6-dichlorobenzonitrile is prepared by hydrolysis of the corresponding cyanohydrin or of 1,2,2,6,6-pentachlorocyclohexane-carbonitrile. This is suitably effected by treating the nitrile with concentrated sulphuric acid. This reaction is preferably carried out at a temperature in the range 50° to 95° C. when a reaction time of about 30 minutes in general suffices. The reaction mixture is then poured on to ice or into water or ice and water and the solid product collected and, if desired, recrystallised. An aromatic hydrocarbon solvent such as benzene or a mixture of ether and light petroleum are suitable solvents for this purpose.

According to another extension of the process of the invention, the compound of formula

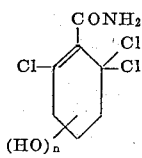

used as starting material for conversion of 2,6-dichloro-benzonitrile, is prepared by treating the epoxy amide of formula

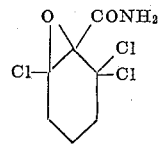

with an aqueous solution of a strong acid at an elevated temperature. Suitable for this purpose is a 50% by weight aqueous solution of sulphuric acid at a temperature in the range 70° C. up to the boiling point. When the epoxy-amide has dissolved, the solution is diluted with water, preferably after cooling, and the resulting solid product, collected and if desired, recrystallised from a solvent. Methanol or aqueous ethanol is a suitable solvent. The precise structure of the product has not been established with certainty but it is believed to be the 3-hydroxy compound

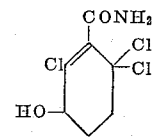

The above epoxy-amide may, according to a further extension of the process of the invention, be prepared by alkaline hydrolysis of the corresponding epoxy-nitrile.

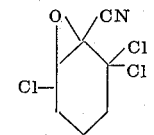

The hydrolysis is suitably effected by treating the epoxy-nitrile with an aqueous or aqueous alcoholic solution of an alkali metal hydroxide, particularly potassium hydroxide. The hydrolysis is carried out at a temperature low enough to avoid opening the epoxide ring. In general, temperatures below 30° C. and preferably below 20° C. are suitable. Prolonged reaction times, for example, 12 to 24 hours are in general necessary.

Alternatively, and according to another extension of the process of the invention, the above epoxy-amide is prepared by treating 2,2,6,6-tetrachloro-1-hydroxycyclohexanecarbonamide with a base or basic acting substance. The base or basic acting substance used may be an alkali metal hydroxide, carbonate or bicarbonate or it may be an organic nitrogenous base, for example, an aliphatic secondary or tertiary amine, particularly diethylamine or triethylamine or a heterocyclic nitrogenous base, for example, pyridine. The treatment is advantageously effected in presence of a solvent, for example, water, an alcohol or an aqueous alcohol.

According to a further extension of the process of the invention the cyanohydrin of formula

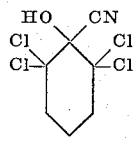

which is a novel compound, is prepared by treating 2,2,6,6-tetrachlorocyclohexanone with hydrogen cyanide. The reaction may be effected by simply mixing the ketone, or a solution thereof in a suitable solvent, with anhydrous hydrogen cyanide, preferably with a small excess thereof, for example 10 to 20% excess. An aliphatic alcohol of 1 to 4 carbon atoms may be used as the solvent. Preferably a trace of potassium or sodium cyanide or other basic catalyst is added to the reaction mixture. When the reaction is complete, the catalyst is neutralised with the requisite amount of sulphuric acid and the excess hydrogen cyanide is distilled from the mixture.

Instead of using anhydrous hydrogen cyanide per se, the hydrogen cyanide may be generated in situ from an alkali metal cyanide by treatment with an acid, for example, glacial acetic acid, sulphuric acid or hydrogen chloride, or with an aqueous solution of a mineral acid, for example, 30% aqueous sulphuric acid. The cyanohydrin may also be prepared from 2,2,6,6-tetrachlorocyclohexanone by an exchange reaction with the cyanohydrin of an aldehyde or of another ketone, said aldehyde or ketone being preferably readily volatile compounds. The cyanohydrin of acetone is particularly suitable for this purpose.

By treating 2,2,6,6-tetrachlorocyclohexanone with hydrogen cyanide in presence of an alkali metal cyanide, especially with an excess of alkali metal cyanide, or the cyanohydrin of 2,2,6,6-tetrachlorocyclohexanone with an alkali metal cyanide, an epoxy-nitrile is formed which has the following formula:

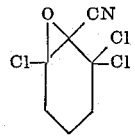

The reaction may be effected in presence of a solvent, an aliphatic alcohol of 1 to 4 carbon atoms, particularly ethanol, being suitable for this purpose. This epoxy-nitrile is a novel compound and is a useful intermediate. This compound and its preparation are further features of the invention.

According to the still further extension of the process of the invention, the 2,2,6,6-tetrachlorocyclohexanone is prepared by treating cyclohexanol with chlorine. The reaction may be effected in presence of actinic light and optionally also in presence of an organic peroxide such as benzoyl peroxide as described in German Patent 823,-449 to Henkel and Company.

The following examples illustrate the process of the invention and the various extensions thereof. In these examples, parts by weight (w.) and parts by volume (v.) bear the same relationship as the kilogram and the litre. Temperatures are given in degrees centigrade.

2,2,6,6-tetrachlorocyclohexanone was prepared according to the directions given by R. Riemschneider (Monatsh., 1954, 85, 417).

*Example I.—Preparation of the cyanohydrin of 2,2,6,6-tetrachlorocyclohexanone, i.e., 2,2,6,6-tetrachloro-1-hydroxycyclohexanecarbonitrile*

To a stirred suspension of potassium cyanide (25 w.) in ethanol (250 v.) at 0° was gradually added, first glacial acetic acid (22 v.), and then 2,2,6,6-tetrachlorocyclohexanone (20 w.) in ethanol (250 v.). The resulting mixture was kept overnight at room temperature, made strongly acid by the addition of dilute sulphuric acid and diluted with a large volume of water. The product was extracted with ether, and the extract washed with water, dried over magnesium sulphate and evaporated. The residual oil (22 w.) crystallised on standing in the refrigerator and was recrystallised from a mixture of ether and light petroleum (B.P. 40–60°) at 0° to afford 2,2,6,6-tetrachloro-1-hydroxycyclohexane carbonitrile as needles (12 w.). The melting point of the cyanohydrin was diffuse and variable, even after repeated recrystallisation; analytically pure material was completely molten at temperatures ranging from about 100° to 110°. The infra-red spectrum showed a band at 2.87μ (O—H).

The mother-liquors from the first recrystallisation were evaporated and the residue was recrystallised from carbon tetrachloride to yield a further quantity (5.4 w.) of the cyanohydrin (total yield 78%).

*Analysis.*—Found: C 32.1, H 2.8, Cl 53.6, N 5.2%. C₇H₇Cl₄NO requires: C 32.0, H 2.7, Cl 53.9, N 5.3%.

*Example II.—Preparation of 2,6,6-trichloro-1,2-epoxy-cyclohexanecarbonitrile*

(a) *From 2,2,6,6-tetrachlorocyclohexanone directly.*— This preparation was carried out by the method described in Example I using potassium cyanide (30 w.) in ethanol (300 v.), glacial acetic acid (15 v.), and 2,2,6,6-tetrachlorocyclohexanone (25 w.) in ethanol (300 v.), the mixture being allowed to stand for one week. Working up as described in Example I yielded an oil (22 w.), which crystallised on standing in the refrigerator. Recrystallisation from a mixture of ether and light petroleum (B.P. 40° to 60°) at 0° furnished 2,6,6-trichloro-1,2-epoxy-cyclohexanecarbonitrile as prisms (13 w.) melting point 44–45°, raised to 45–46° on further recrystallisation. The infra-red spectrum showed no O—H, C=O or C=C bands, but exhibited a very weak band at 4.41μ (C≡N).

A second crop of the epoxynitrile (6.3 w.), melting point 39.5° to 43.5°, was obtained from the mother-liquors of the above recrystallisation (total yield 80%).

*Analysis.*—Found: C 37.0, H 2.7, Cl 47.4, N 6.5%. C₇H₆Cl₃NO requires: C 37.1, H 2.7, Cl 47.0, N 6.2%.

(b) *From the cyanohydrin of Example I by the action of potassium cyanide.*—A mixture of the cyanohydrin (1.6 w.), potassium cyanide (1.6 w.), and ethanol (15 v.) was kept at room-temperature for two days. Working up as described above then gave a quantitative yield of the epoxy-nitrile, melting point and mixed melting point 45° to 46° after recrystallisation.

*Example III.—Preparation of 1,2,2,6,6-pentachloro-cyclohexanecarbonitrile*

A mixture of the cyanohydrin of Example I (7.9 w), thionyl chloride (25 v.) and pyridine (0.3 v.) was refluxed for 6 hours. The excess thionyl chloride was removed under reduced pressure and benzene was distilled from the residue (8.9 w.), which was then treated with methanol. The resulting crystalline 1,2,2,6,6-pentachloro-cyclohexanecarbonitrile (3.2 w., 38%) was obtained on recrystallisation from a mixture of ether and chloroform as elongated prisms, melting point 182–183° C. The infra-red spectrum showed a very weak band at about 4.43μ (C≡N).

*Analysis.*—Found: C 29.7, H 2.2, N 5.1%. C₇H₆Cl₅N requires: C 29.9, H 2.1, N 5.0%.

*Example IV.—Preparation of 1-acetoxy-2,2,6,6-tetrachlorocyclohexanecarbonitrile*

(a) *Using acetyl chloride.*—A mixture of cyanohydrin of Example I (5.8 w.), acetyl chloride (25 v.), and pyridine (0.3 v.) was refluxed for 65 hours. The excess acetyl chloride was removed under reduced pressure and the crystalline residue washed with methanol to afford 1-acetoxy-2,2,6,6-tetrachlorocyclohexanecarbonitrile (2.5 w., 37% yield), melting at 189.5–190.5° after recrystallisation from chloroform. The infra-red spectrum showed a band at 5.54μ (C≡O).

*Analysis.*—Found: C 35.3, H 3.1, Cl 46.3, N 4.6%. C₉H₉Cl₄NO₂ requires: C 35.4, H 3.0, Cl 46.5, N 4.6%.

(b) *Using acetic anhydride.*—A mixture of the cyanohydrin of Example I (4.3 w.), acetic anhydride (20 v.) and pyridine (0.3 v.) was heated for 5 days in an oil bath maintained at 120° to 130° C.

The reaction mixture was cooled, poured into water and methanol was added. The resulting crystalline acetoxy nitrile (2.6 w.; 52% yield) was collected, washed and recrystallised as above. It had melting point and mixed melting point 188° to 190°.

(c) *Using benzoyl chloride.*—A mixture of the cyanohydrin (5.0 w.), benzoyl chloride (5 v.) and pyridine (0.3 v.) was heated for 5 days in a bath maintained at 120° to 130° C. Lower boiling material was then removed by distillation at 0.15 mm. and the residue treated with methanol to afford 1-benzoyloxy-2,2,6,6-tetrachloro-cyclohexanecarbonitrile, M.P. 167.5 to 168° C. after recrystallisation from a mixture of chloroform and methanol. Yield 7%.

*Analysis.* — Found: C 46.3, H 2.9, N 3.8%. C₁₃H₁₁Cl₄NO₂ requires: C 45.8, H 3.0, N 3.8%.

*Example V.—Preparation of 2,6,6-trichloro-1,2-epoxy-cyclohexanecarbonamide*

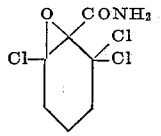

(a) *From 2,6,6-trichloro-1,2-epoxycyclohexanecarbonitrile.*—A mixture of the epoxy-nitrile (4.5 w.), potassium hydroxide (5.0 w.), ethanol (45 v.) and water (5 v.) was kept overnight at room temperature. The dark solution was poured into water, the crystalline product collected, washed with little water and dried to give the desired amide, M.P. 145° to 146° C. (2.5 w.) Recrystallisation from benzene afforded needles M.P. 145.5 to 146.5° C.

*Analysis.*—Found: C 34.7, H 3.6, Cl 43.1, N 5.6%. C₇H₈Cl₃NO₂ requires: 34.4, H 3.3 Cl 43.5, N 5.7%.

A further quantity of the epoxy-amide was obtained from the original filtrate by saturating it with sodium chloride. Total yield 82%.

(b) *From 2,2,6,6 - tetrachloro-1-hydroxycyclohexanecarbonamide.*—A mixture of the hydroxy-amide (10 w.), potassium hydroxide (20 w.), ethanol (100 v.) and water (100 v.) was warmed on a boiling water bath for 15 minutes. Addition of brine then precipitated the epoxy-amide, M.P. and mixed M.P. 145° to 146° C. after recrystallisation. Yield 76%.

*Example VI.—Preparation of 2,2,6,6-tetrachloro-1-hydroxycyclohexanecarbonamide*

(a) *From the cyanohydrin of 2,2,6,6-tetrachlorocyclohexanone.*—A solution of the cyanohydrin (5.1 w.) in concentrated sulphuric acid (10 v.) was warmed on a boiling water bath for 30 minutes and then poured into ice-water. The crystalline product was collected, washed with cold water, dried and recrystallised from benzene when its was obtained as needles of M.P. 202° to 203°. Yield 84%.

*Analysis.*—Found: C 30.0, H 3.1, Cl 50.0, N 5.0%. C₇H₉Cl₄NO₂ requires: C 29.9, H 3.2, Cl 50.5, N 5.0%.

(b) *From 1,2,2,6,6 - pentachlorocyclohexanecarbonitrile.*—The nitrile (8.2 w.) was dissolved in warm concentrated sulphuric acid (20 v.) with evolution of hydrogen chloride. The resulting solution was then worked up as above to yield the hydroxy-amide in 78% yield, M.P. and mixed M.P. 202° to 203° after recrystallisation from a mixture of ether and light petroleum.

*Example VII.—Preparation of the compound of empirical formula C₇H₈Cl₃NO₂ and believed structure*

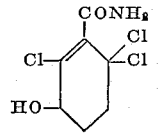

2,6,6 - trichloro-1,2-epoxycyclohexanecarbonamide (88 w.) was dissolved in hot 50% sulphuric acid (70 v.) and the solution cooled and diluted with water. The crystalline product was collected and washed with water, affording the amide M.P. 195° to 196° C. with frothing after recrystallisation from methanol. Yield 60%.

*Analysis.*—Found: C 34.4, H 3.4, Cl 43.2, N 5.8%. C₇H₈Cl₃NO₂ requires: C 34.4, H 3.3, Cl 43.5, N 5.7%.

The infra-red spectrum showed bands at 2.84, 2.94 and ca. 3.1µ (O—H and N—H) and at 5.95µ (C=O) and 6.38µ (Amide II); there was an indication of an unresolved band in the region characteristic of C=C.

To a solution of this amide (0.62 w.) in concentrated sulphuric acid (5 v.) at 0° C. was added slowly an ice cold solution of sodium nitrite (0.7 w.) in water (5 v.). The mixture was then heated on the steam bath for 15 minutes and poured into water. The crude oily product (0.51 w.), collected by ether extraction, could not be induced to crystallise. It dissolved in sodium bicarbonate solution with effervescence and its infra-red spectrum showed bands at ca. 2.9µ (O—H), 5.82µ (C=O) and 6.22µ (C=C) It was, therefore, concluded that the product was an unsaturated carboxylic acid. These results eliminated the 2,6,6-trichloro-1-hydroxycyclohexanecarbonamide structure since this compound would be expected to afford a ketone under the reaction conditions. The structure given at the beginning of this example was therefore assigned to this product.

*Example VIII.—Preparation of 2,6-dichlorobenzonitrile*

(a) *From 1,2,2,6,6 - pentachlorocyclohexanecarbonitrile.*—The chloro-nitrile (1.1 w.) was heated for one hour in an oil bath maintained at 225° to 235°. The resulting tar was extracted repeatedly with boiling light petroleum (B.P. 40° to 60°), and the combined extracts were evaporated. The residue was then kept at a temperature of 90° to 100° under 20 mm. pressure in a sublimation apparatus, affording 2,6-dichlorobenzonitrile as a sublimate (0.45 w., 67% yield). Recrystallisation from light petroleum (B.P. 40°–60°) furnished needles, melting point and mixed melting point 145° to 146°.

(b) *From 1-acetoxy-2,2,6,6-tetrachlorocyclohexanecarbonitrile.*—The acetoxy-nitrile (1.1 w.) was heated for 30 minutes in an oil bath maintained at 260° to 270°. The resulting tar was then worked up as above to yield 2,6-dichlorobenzonitrile (0.11 w., 18% yield).

(c) *From 2,2,6,6 - tetrachloro-1-hydroxycyclohexanecarbonamide.*—A mixture of the hydroxyamide (25 w.) and phosphorus pentoxide (10 w.) was heated for 30 minutes in a bath maintained at 250° to 260° C. The cooled product was collected in boiling ether, the ether removed and the residual 2,6-dichlorobenzonitrile sublimed. Yield 19%.

(d) *From the amide prepared according to Example VII.*—A mixture of the amide (10 w.) and phosphorus pentoxide (10 w.) was heated for one hour in a bath maintained at 220° to 230° and then worked up as described in (c) to give a 37% yield of 2,6-dichlorobenzonitrile M.P. 145.5° to 146.5° after recrystallisation from ether-light petroleum.

We claim as our invention:

1. The compound of the formula:

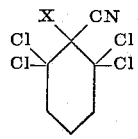

wherein X is a member of the group consisting of hydroxy and acetoxy.

2. The compound of the formula:

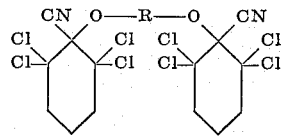

wherein R is a member of the group consisting of

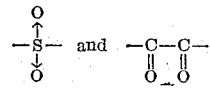

3. 1,2,2,6,6-pentachlorocyclohexanecarbonitrile.
4. 1-acetoxy-2,2,6,6-tetrachlorohexanecarbonitrile.

References Cited by the Examiner

UNITED STATES PATENTS

| | | | |
|---|---|---|---|
| 2,174,568 | 10/1939 | Davies et al. | 260—465 |
| 2,394,871 | 2/1946 | Perrine | 260—557 |
| 2,591,415 | 4/1952 | Engelhardt et al. | 260—465 |
| 2,677,705 | 5/1954 | Utzinger | 260—557 |
| 2,730,531 | 1/1956 | Payne et al. | 260—348 |
| 2,781,393 | 2/1957 | Hackert et al. | 260—464 |
| 2,802,019 | 8/1957 | Westfahl | 260—464 |
| 2,894,959 | 7/1959 | Phillips et al. | 260—348 |

OTHER REFERENCES

Linden, Chem. Abs., 28, p. 4719 (1934).

Migrdichian, "The Chemistry of Organic Cyanogen Compounds," 1947, pp. 188–190.

CHARLES B. PARKER, *Primary Examiner.*

NICHOLAS S. RIZZO, *Examiner.*